United States Patent
Hepkin (10) Patent No.: US 9,928,094 B2
(45) Date of Patent: Mar. 27, 2018

(54) HARDWARE ACCELERATED VIRTUAL CONTEXT SWITCHING

(71) Applicant: Microsoft Technology Licensing, LLC, Redmond, WA (US)

(72) Inventor: David Alan Hepkin, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 81 days.

(21) Appl. No.: 14/667,879

(22) Filed: Mar. 25, 2015

(65) Prior Publication Data

US 2016/0147555 A1   May 26, 2016

Related U.S. Application Data

(60) Provisional application No. 62/084,412, filed on Nov. 25, 2014.

(51) Int. Cl.
| | | |
|---|---|---|
| *G06F 9/455* | (2006.01) | |
| *G06F 9/50* | (2006.01) | |
| *G06F 9/44* | (2018.01) | |

(52) U.S. Cl.
CPC ............ *G06F 9/45558* (2013.01); *G06F 9/44* (2013.01); *G06F 9/5077* (2013.01); *G06F 2009/4557* (2013.01)

(58) Field of Classification Search
CPC ...... G06F 9/45558; G06F 9/5077; G06F 9/44; G06F 2009/4557
See application file for complete search history.

(56) References Cited

U.S. PATENT DOCUMENTS

| | | | |
|---|---|---|---|
| 6,708,326 B1 | 3/2004 | Bhattacarya | |
| 8,327,438 B2 | 12/2012 | Hwang et al. | |
| 8,510,756 B1 | 8/2013 | Koryakin et al. | |
| 8,522,253 B1 | 8/2013 | Rozas et al. | |
| 2002/0161961 A1* | 10/2002 | Hardin ............... | G06F 13/24 711/6 |

(Continued)

FOREIGN PATENT DOCUMENTS

| | | |
|---|---|---|
| WO | WO 03046712 A2 | 6/2003 |
| WO | 2013147887 A1 | 10/2013 |

OTHER PUBLICATIONS

Liu, et al., "High Performance VMM-Bypass I/O in Virtual Machines", In Proceedings of the Annual Conference on Annual Technical Conference, May 30, 2006, 32 pages.

(Continued)

*Primary Examiner* — Lewis A Bullock, Jr.
*Assistant Examiner* — Jacob D Dascomb
(74) *Attorney, Agent, or Firm* — Workman Nydegger (57) ABSTRACT

In a virtual computing environment, a system configured to switch between isolated virtual contexts. A system includes a physical processor. The physical processor includes an instruction set architecture. The instruction set architecture includes an instruction included in the instruction set architecture for the physical processor that when invoked indicates that a virtual processor implemented using the physical processor should switch directly from a first virtual machine context to a second virtual machine context. The first and second virtual machine contexts are isolated from each other.

20 Claims, 4 Drawing Sheets

(56) References Cited

U.S. PATENT DOCUMENTS

| | | | |
|---|---|---|---|
| 2005/0132364 A1* | 6/2005 | Tewari | G06F 9/5077 718/1 |
| 2007/0294496 A1* | 12/2007 | Goss | G06F 12/1408 711/163 |
| 2007/0300219 A1* | 12/2007 | Devaux | G06F 12/1491 718/1 |
| 2009/0037936 A1 | 2/2009 | Serebrin | |
| 2009/0044274 A1* | 2/2009 | Budko | G06F 21/53 726/24 |
| 2009/0055571 A1 | 2/2009 | Budko et al. | |
| 2009/0077564 A1 | 3/2009 | Loeser | |
| 2009/0241189 A1* | 9/2009 | Shanbhogue | G06F 13/26 726/23 |
| 2012/0072669 A1* | 3/2012 | Nishiguchi | G06F 12/1027 711/135 |
| 2013/0117743 A1* | 5/2013 | Neiger | G06F 9/455 718/1 |
| 2014/0095848 A1 | 4/2014 | Gschwind et al. | |
| 2014/0281465 A1 | 9/2014 | Catherwood et al. | |
| 2015/0019847 A1* | 1/2015 | Catherwood | G06F 9/462 712/229 |
| 2015/0178497 A1* | 6/2015 | Lukacs | G06F 9/461 726/23 |

OTHER PUBLICATIONS

Kurjanowicz, Matthew, "An Integrated OS-plus VMM-bypass Solution for Virtualized I/O", Published n: May 2, 2007, Available at: https://smartech.gatech.edu/jspui/bitstream/1853/16115/kurjanowicz_matthew_d_200705_ro.pdf.

"Resource Virtualization", Published on: Jul. 21, 2011, Available at: http://ckng62.blogspot.in/2011_07_01_archive.html.

Bunchc, "Context Switching, Some Resources", Published on: Nov. 29, 2010, Available at: http://professionalvmware.com/2010/11/context-switching-some-resoures/.

Kent, et al., "Context Switching in a Hardware/Software Co-Design of the Java Virtual Machine", In Proceedings of Designer's Forum of Design Automation & Test in Europe, Mar. 2002, 6 pages.

Liebetrau, Etienne, "Understanding Hyper-V CPU Usage (Physical and Virtual)", Published on: Aug. 15, 2013, Available at: http://fastvue.co/tmgreporter/blog/understanding-hyper-v-cpu-usage-physical-and-virtual.

"International Search Report & Written Opinion issued in PCT Application No. PCT/US2015/060957", dated Feb. 16, 2016, 10 pages.

"International Preliminary Report on Patentability Issued in PCT Application No. PCT/US2015/060957", dated Nov. 14, 2016, 5 Pages.

* cited by examiner

HARDWARE ACCELERATED VIRTUAL CONTEXT SWITCHING

CROSS-REFERENCE TO RELATED APPLICATIONS

This application claims the benefit of and priority to U.S. Provisional Patent Application Ser. No. 62/084,412 filed on Nov. 25, 2014 and entitled "Hardware Accelerated Virtual Context Switching," which application is expressly incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Computing systems can be implemented in a fashion where virtual machines are implemented using physical machines. In particular, a physical machine can host one or more, and typically several, virtual machines. Typically, a virtual machine context (VMC) is maintained for each virtual processor or virtual machine. The VMC provides the processor context for a guest virtual machine. Typically, a single VMC may be maintained for each virtual machine, or each virtual machine processor, on a one to one basis.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a method that may be practiced in a virtual computing environment. The method includes acts for switching between isolated virtual contexts. The method includes determining that a virtual processor should switch from a first virtual machine context to a second virtual machine context. The first and second virtual machine contexts are isolated from each other. A physical processor receives an instruction included in the instruction set architecture for the physical processor indicating that the virtual processor should switch directly from the first virtual machine context to the second virtual machine context. As a result, the method includes performing the virtual context switch by executing functions native to the physical processor defined natively for the instruction.

Another embodiment is implemented in a virtual computing environment. The embodiment includes a system configured to switch between isolated virtual contexts. The system includes a physical processor. The physical processor includes an instruction set architecture. The instruction set architecture includes an instruction included in the instruction set architecture for the physical processor that when invoked indicates that a virtual processor implemented using the physical processor should switch directly from a first virtual machine context to a second virtual machine context. The first and second virtual machine contexts are isolated from each other.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
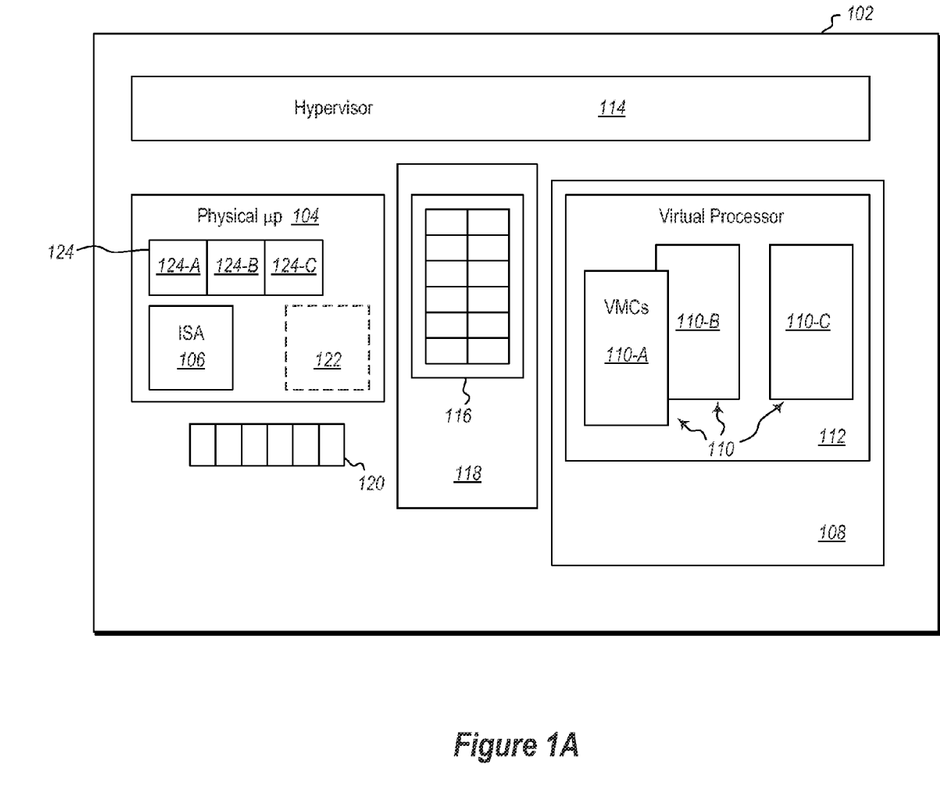
FIG. 1A illustrates a generalized example system having a processor with an instruction set architecture that includes an instruction for virtual machine context switching.

As noted in the background above, typically there is a single virtual machine context (VMC) per virtual processor in a virtual machine. So, if a single virtual machine has just a single virtual processor, there would be one VMC for the virtual machine (for the one virtual processor). If the virtual machine has two virtual processors, there would be two virtual machine contexts for the virtual machine, one for each virtual processor. However, there may be scenarios where a single virtual processor uses multiple VMCs. FIG. 1A illustrates generalized example where a virtual processor 112 is able to switch between several VMCs 110-A, 110-B, and 110-C.

Figure 1B:
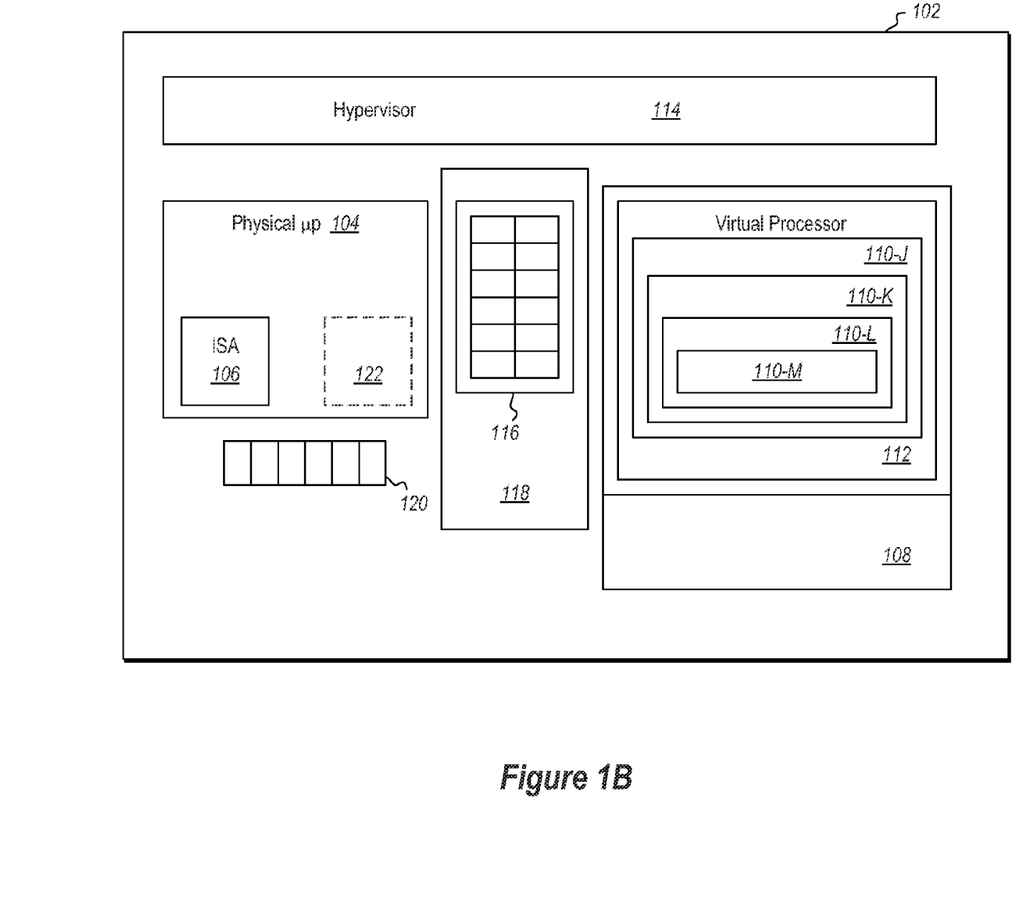
FIG. 1B illustrates an example system with hierarchical virtual trust levels, where the system has a processor with an instruction set architecture that includes an instruction for virtual machine context switching.

One example where a virtual processor may switch between several VMCs is when there is a desire to switch between virtual trust levels. An example of this is illustrated in FIG. 1B, where hierarchical switching from a high trust level VMC 110-J through and to lower trusted level VMCs 110-K, 110-L and 110-M. One real world example of this is a technology referred to as Virtual Secure Mode (VSM). With VSM, each virtual processor on a virtualization platform, such as Hyper-V available from Microsoft Corporation of Redmond Wash., has multiple virtual trust levels (VTL's). Each virtual trust level provides a different security boundary, and the virtualization platform provides the ability for a virtual processor to switch between different virtual trust levels. There is a separate CPU context associated with each VTL.

On most modern computer architectures that support processor virtualization, the concept of a VMC provides the processor context for a guest virtual machine. The processor provides capabilities for a hypervisor to load a processor's context from a VMC and to save a processor's context to a virtual machine context.

For VSM, the hypervisor maintains a separate VMC for each virtual trust level. On some processors, such as some available from Intel Corporation of Santa Clara, Calif., this means having a separate virtual machine context structure (VMCS) for each virtual trust level. VSM may be implemented as a hierarchical system where different VMCs have different hierarchically defined privileges.

When a guest virtual machine OS running on a virtual processor wishes to switch its active VTL, it makes a hypercall into the hypervisor on the physical machine to request a switch. The hypervisor enacts the switch by changing the active VMC and then returning from the hypercall. This requires execution of a number of different machine instructions to cause the switch.

Figure 1C:
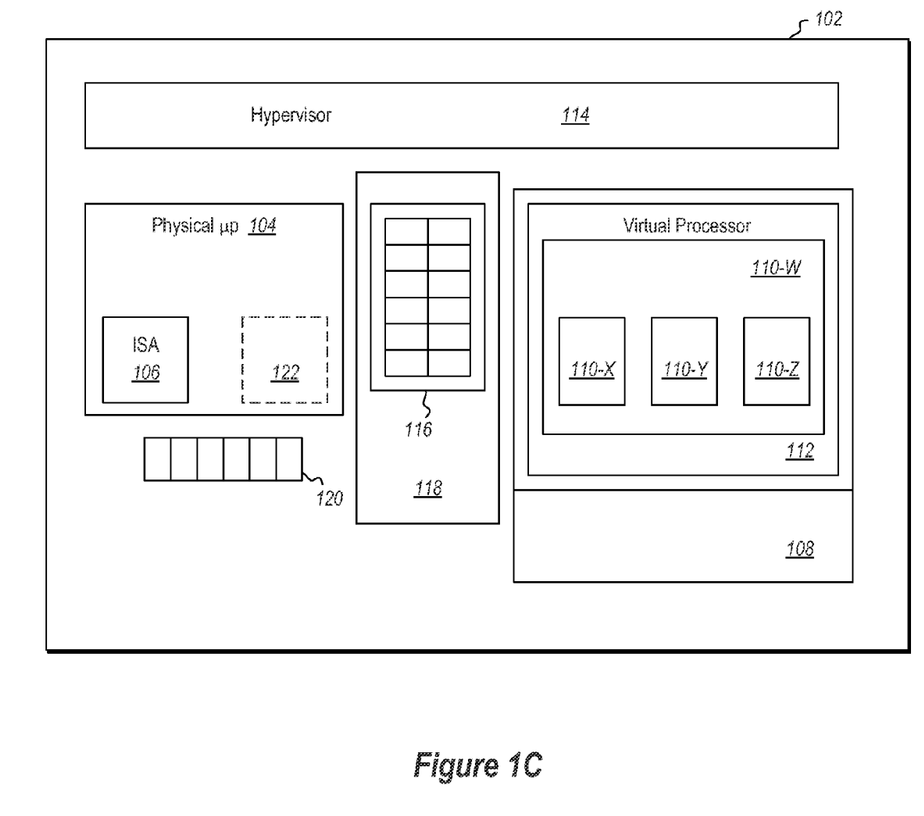
FIG. 1C illustrates an example system with sibling virtual machine contexts having a processor with an instruction set architecture that includes an instruction for virtual machine context switching.

It should be noted that while VSM is one example of a technology that leverages multiple VMCs for a single virtual machine, there are other technologies that could also use multiple VMCs for a single virtual machine. For example, in nested virtualization, as illustrated in FIG. 1C, there may be situations where several virtual machines are implemented on main virtual machines. For example, FIG. 1C illustrates a main VMC 110-W and several sibling VMCs 110-X, 110-Y and 110-Z running within the main VMC 110-W. The virtual machines running on the main virtual machine may be implemented as different VMCs (e.g. VMCs 110-X, 110-Y and 110-Z) of the main virtual machine (e.g., a virtual machine having the VMC 110-W). It may be desirable, in such situations, to switch between the different VMCs. This is simply one example and it should be appreciated that other VMC switching scenarios might be implemented.

These two examples illustrate two arrangements of VMC. The first example (i.e. the VSM example) is an example of multi-level hierarchical VMCs where each of the different VMCs are in a different level of the hierarchy with respect to each other. In contrast, in the second example (i.e. nested virtualization) the majority of the virtual machines (i.e. the virtual machines running on the main virtual machine) have sibling VMCs where each VMC has the same or a very similar privilege level with respect to other sibling VMCs.

While previous VMC switching relied on a hypervisor to manage and perform the switching, resulting in increased processor overhead to execute the various functions associated with hypervisor communications, functionality is described herein for a processor instruction included in the instruction set architecture of a class of processors that when invoked would accelerate a virtual context switch. Reference is now made to FIG. 1A, which illustrates a system 102, which includes a physical processor 104 having an instruction set architecture 106, which includes an instruction. The instruction would provide the ability for a guest virtual machine 108 to initiate a VMC switch between VMCs 110 for a virtual processor 112 without generating an intercept into the hypervisor 114 (i.e. allow a guest virtual machine to switch a VMC on its own without going through a virtual machine (VM) exit).

By invoking a processor instruction included as part of the instruction set architecture 106 of a physical processor 104, as opposed to allowing the hypervisor 114 to manage VMC switches, systems can increase computer system performance and speed by using a reduced amount of overall processing to be performed by eliminating the overhead processing required when the hypervisor 114 performs the VMC switch.

Power can be conserved on mobile computing devices (or any computing device for that matter) by reducing the overall number of processor operations that need to be performed to accomplish a VMC switch.

To accelerate a VMC switch, a new instruction is implemented in an instruction set architecture 106 for a class of processors (or classes of processors) that allows a guest virtual machine 108 to initiate a switch to a different VMC by invoking the instruction. For the remainder of this document, for convenience, this instruction is referred to as a VMCSWITCH instruction. However, it should be noted that this is not meant to be limiting, but rather merely for example purposes.

This VMCSWITCH instruction causes state save operations and state restoration operations to be performed using native functionality of the physical processor 104 rather than the state save operations that occur on a VM exit into a hypervisor by direction of the hypervisor and the state restoration operations that occur on a VM entry into the guest virtual machine by direction of the hypervisor.

For example, if a guest virtual machine 108 was running with an active VMC 110-A and initiates a VMCSWITCH to switch to VMC 110-B, the following would occur:

1. Current guest virtual machine 108 state is saved into VMC 110-A by native physical processor functionality included in the instruction set architecture 106 for the VMCSWITCH instruction. State save can include operations like saving machine state registers (MSRs) to a MSR store area. Several different alternatives may be implemented for an MSR store area. For example, MSRs may simply be stored to system memory 118. Alternatively, MSRs may be stored to on-board memory 122 for faster access. Further still, the physical processor 104 may include a special MSR store 124 specially configured to hold MSR state and to itself be used as state registers such that a separate save operation is not needed. In this way, when a VMC is changed, there may be no need to reload MSR state into the MSRs, but rather the appropriate portion of the MSR store 124 could be used as the MSRs. For example, MSR store portion 124-A may essentially be the MSRs for VMC 110-A, MSR store portion 124-B may essentially be the MSRs for VMC 110-B, and MSR store portion 124-C may essentially be the MSRs for VMC 110-C.

2. New guest virtual machine state is loaded from VMC 110-B into the virtual processor 112 using native physical processor 104 functionality included in the instruction set architecture 106 for the VMCSWITCH instruction. This can include operations such as restoring MSRs from a MSR store area, restoring the guest virtual machine's instruction pointer, etc. In the example where an MSR store 124 is used, embodiments can simply point to the appropriate MSR store portion to activate the appropriate state.

If there is a problem loading the state from VMC 110-B, an intercept can be generated to the hypervisor 114. In this way, the hypervisor can be integrated into VMC switching as needed, but excluded from managing the low-level VMC switching operations when such management can be performed by the physical processor by using the functionality associated with the specialized VMCSWITCH instruction.

In some embodiments, the virtual processor 112 provides the ability for the hypervisor 114 to control whether a guest virtual machine 108 can use the VMCSWITCH instruction.

For example, the virtual processor's VMCs could be extended to include a control bit that indicates whether a guest virtual machine 108 can use the new VMCSWITCH instruction. If the control bit is disabled, an attempt by a guest virtual machine 108 to use this new instruction, in some embodiments, will result in the hypervisor becoming more involved in the switch. For example, in some embodiments, attempting to use the VMCSWITCH instruction when the control bit is disabled will cause an exception or generate an intercept into the hypervisor 114. In this way, the hypervisor 114 can control the amount of interaction the hypervisor 114 has in VMC switching by allowing a virtual machine to self-context switch, or preventing the virtual machine from self-context switching, and instead having the hypervisor 114 perform the context switching.

In addition to being able to control whether a guest virtual machine can use the new VMCSWITCH instruction, the virtual processor may also provide the ability to allow the hypervisor 114 to control the specific VMC's to which a guest virtual machine 108 can switch. In one example embodiment, this can be achieved by the hypervisor 14 maintaining a list 116 of valid VMC's to which a guest virtual machine 108 can switch. This could be maintained, for example, as follows:

The list 116 of valid "target" VMC's for a switch is referred to as the "VMC list." In the example illustrated, this is organized into a page of memory 118. The hypervisor 114 provides a page with a list of VMC pointers, and the guest virtual machine 108 selects a VMC by specifying an index into this list 116 as a parameter to the VMCSWITCH instruction. The hypervisor 114 provides a pointer to this list via a field in the VMC. Embodiments may include functionality for indicating whether a particular entry in the list 116 is invalid (e.g. a value of 0 in the list could mean the VMC pointer is invalid). The VMC pointers may be, for example, physical addresses. While the example illustrates shows the list implemented in main memory 118, in other embodiments, the processor 104 itself may have a list storage structure 128 implemented in hardware, such as special hardware registers, on the processor 104.

An operand to the VMCSWITCH instruction specifies a VMC in the VMC list 116. In particular, the operand specifies an index into the list.

With this new VMCSWITCH capability, a guest virtual machine 108 could issue a VMCSWITCH instruction to switch its active VMC. When issuing the VMCSWITCH instruction, the guest virtual machine 108 specifies an entry in the VMC list 116 (or list storage structure 128) via a general purpose register 120. This general purpose register 120 contains an index into the VMC list 116 that indicates the target VMC to which the guest virtual machine 108 would like to switch.

The virtual processor 112 validates the VMC pointer entry in the list 116 identified by the target index. If the VMC pointer is invalid, VMCSWITCH generates an intercept into the hypervisor 114 with a new exit code to indicate the reason for the intercept.

If the VMC pointer entry is valid, the physical processor 104 performs the VMC switch as described above using native processor functionality included as part of the VMCSWITCH instruction functionality. Upon completion of the VMC switch, a new VMC is active, and thus, a new list of VMC pointers could become active as possible targets for the VMCSWITCH instruction. The virtual processor 112 is executing at the instruction pointer location specified in the newly active VMC.

In the example illustrated above, VMCs may be stored in memory 118. This memory 118 could be main memory coupled to a physical processor. However, in some embodiments, VMCs could be stored in on-board memory 122 (such as cache memory) included on the same semiconductor die with the physical processor 104 or coupled to the physical processor 104 in a fashion that allows quicker access to data than main memory. In this way, VCS switching could be faster and more efficient. As discussed above, in other alternative embodiments, VMCs may be stored by storing MSR state in the MSR store 124.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
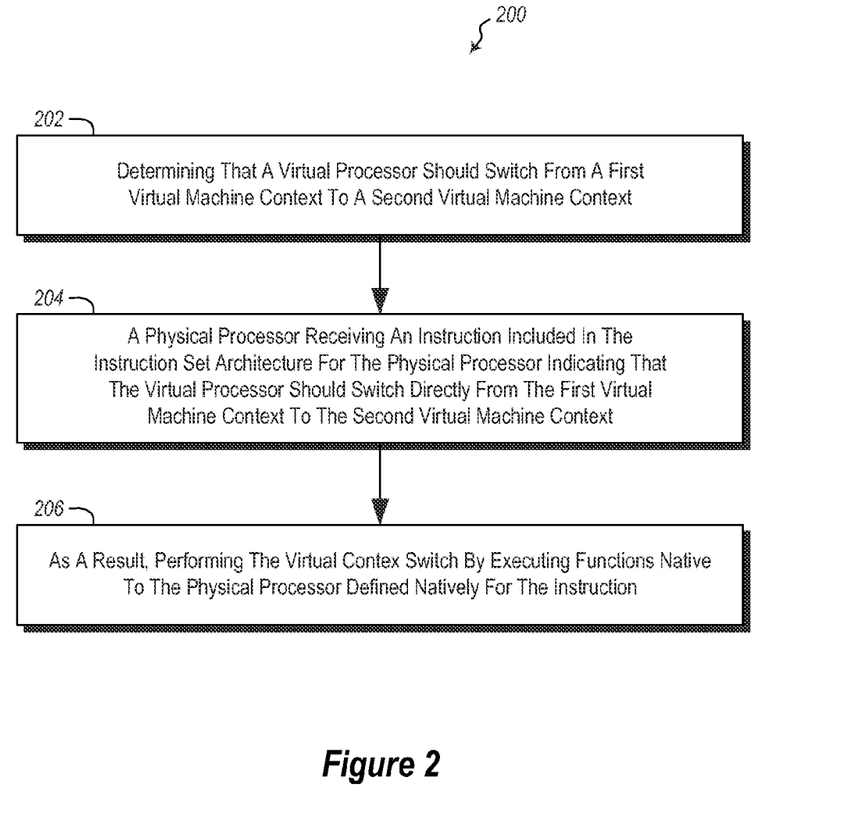
FIG. 2 illustrates a method for switching between isolated virtual machine contexts

Referring now to FIG. 2, a method 200 is illustrated. The method 200 may be practiced in a virtual computing environment where virtual machines are implemented on physical hardware. The method includes acts for switching between isolated virtual machine contexts. The method includes determining that a virtual processor should switch from a first virtual machine context to a second virtual machine context (act 202). The first and second virtual machine contexts are isolated from each other. Isolation from each other means that the virtual machine contexts do not have read or write access to each other's context information.

The method further includes a physical processor receiving an instruction included in the instruction set architecture for the physical processor indicating that the virtual processor should switch directly (i.e. without the hypervisor performing switching functionality as a result of a hypercall) from the first virtual machine context to the second virtual machine context (act 204).

As a result, the method 200 further includes performing the switch by executing functions native to the physical processor defined natively for the instruction (act 206).

The method 200 may be practiced where the physical processor receives the instruction from the first virtual context. For example, the VMC 110-A may call an instruction in the instruction set architecture 106 to switch to the VMC 110-B.

The method 200 may be practiced where the first and second contexts are at different hierarchical privilege levels with respect to each other. An example of this is illustrated above in the VSM example where switches are made to different virtual trust levels.

The method 200 may be practiced where the first and second contexts are siblings having the same privilege level with respect to each other. An example of this is illustrated above in the nested virtualization case where virtual machines run inside of other virtual machines.

The method 200 may further include determining that the switch from the first context to the second context is included in an enumeration of allowed context switches. This is illustrated above in the context of the VMC list. In some embodiments, the list may be implemented using an index such that specific details of where actual virtual machine context information is hidden from the various virtual machine contexts. In some embodiments, the hypervisor controls the information in the index for the list.

The method 200 may further include determining whether hardware allows native VMC switching and when not allowed then performing switching by hypervisor control of VMC switching. A determination may be made, for example, by determining a hardware version. The hardware version may have an instruction set architectures with hardware VMC switching support or it may not. Thus, in some examples, the hardware version will be used to determine if hardware VMC switching is supported. In other examples, a determination may be made based on capability information of the hardware stored in a firmware description of the hardware.

However, in some alternative or additional embodiments, hardware supported VMC switching functionality may be determined by verifying that hardware VMC switching has been enabled in hardware that supports VMC switching in the instruction set architecture for the hardware. Thus, even though hardware may support hardware based VMC switching, this can be enabled or disabled in some embodiments. When disabled, VMC switching traps into the hypervisor. In some embodiments, the hypervisor can enable or disable the hardware based VMC switching. The hypervisor may wish to do this in cases where the hypervisor wants to force hypervisor controlled VMC switching. This may be done, for example, when a first VMC requests a VMC switch to obtain some data or functionality of a higher level VMC and needs data returned from the higher level VMC to the first VMC. The hypervisor can perform the VMC switching and return the appropriate data or other information back to the first VMC.

The method 200 may be implemented where switching is transparent to a VMC. This can be done in a fashion such that a VMC cannot independently determine if switching is controlled by the hypervisor or a hardware instruction.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a virtual computing environment, a method of accelerating a switch between isolated virtual contexts that are executing on a same virtual machine by causing the switch to occur without generating an intercept into a hypervisor, the method comprising:

identifying a physical computer system that is executing a virtual machine and that includes a hypervisor, wherein the virtual machine includes a virtual processor that has associated therewith a plurality of virtual machine contexts, each virtual machine context included within the plurality being extended to include a corresponding control bit that is usable by the virtual processor to determine whether the virtual machine is to independently switch virtual machine contexts, whereby, when the virtual machine is configured to independently switch virtual machine contexts, the virtual machine switches virtual machine contexts without generating an intercept into the hypervisor;

maintaining a transfer list for each of the multiple virtual machine contexts such that each virtual machine context has associated therewith a corresponding transfer list, each transfer list designating which, if any, other virtual machine contexts each associated virtual machine context is permitted to switch to during a later switch event;

determining that the virtual processor of the virtual machine should switch from a first virtual machine context to a second virtual machine context, wherein the first and second virtual machine contexts are isolated from each other, wherein an indication of the second virtual machine context is included within a transfer list of the first virtual machine context such that the virtual processor, while executing using the first virtual machine context, is permitted to switch to the second virtual machine context;

analyzing a control bit of the first or second virtual machine context to determine whether the virtual machine is configured to independently switch virtual machine contexts; and after determining that the first or second virtual machine context's control bit indicates that the virtual machine is configured to independently switch virtual machine contexts, receiving an instruction indicating that the virtual processor is to independently switch from using the first virtual machine context to using the second virtual machine context; and performing the virtual context switch (1) by executing functions native to a physical processor associated with the virtual machine and (2) by independently switching from the first virtual machine context to the second virtual machine context on the same virtual machine.

2. The method of claim 1, wherein the instruction is received from the virtual machine while the virtual machine is using the first virtual machine context.

3. The method of claim 1, wherein the first and second virtual machine contexts are at different hierarchical privilege levels with respect to each other.

4. The method of claim 1, wherein the first and second virtual machine contexts are siblings having a same privilege level with respect to each other.

5. The method of claim 1, wherein determining that the virtual processor of the virtual machine should switch from the first virtual machine context to the second virtual machine context further includes determining that the transfer list of the first virtual machine context is currently active, and wherein the method further comprises:

activating a transfer list of the second virtual machine context after performing the virtual context switch, whereby the activated transfer list of the second virtual machine context designates which, if any, other virtual machine contexts the second virtual machine context is permitted to subsequently switch to.

6. The method of claim 1, wherein the method further comprises:

determining whether hardware of the physical computer system allows the virtual machine context switch; and upon a condition in which the hardware of the physical computer system does not allow the virtual machine context switch, causing the virtual machine context switch to be performed by the hypervisor.

7. The method of claim 6, wherein the virtual machine context switching is transparent.

8. The method of claim 1, wherein the physical computer system also includes both an on-board memory and a special machine state register store that is configured to concurrently hold machine state register state while also being used as a state register such that a separate save operation for the first or second context is not needed.

9. A computer system comprising:

one or more processors; and one or more computer-readable hardware storage devices having stored thereon computer-executable instructions that are executable by the one or more processors and that cause a single virtual machine to accelerate a switch between isolated virtual contexts by causing the switch to occur without generating an intercept into a hypervisor, the computer system being configured to:

identify a virtual processor of the single virtual machine, wherein multiple virtual machine contexts are associated with the virtual processor such that the single virtual machine also has associated therewith multiple virtual machine contexts, each of the multiple virtual machine contexts being extended to include a corresponding control bit that is usable by the virtual processor to determine whether the single virtual machine is configured to independently switch virtual machine contexts, whereby, when the single virtual machine is configured to independently switch virtual machine contexts, the single virtual machine switches virtual machine contexts without generating any intercepts to the hypervisor;

maintain a transfer list for each of the multiple virtual machine contexts such that each virtual machine context has associated therewith a corresponding transfer list, each transfer list designating which, if any, other virtual machine contexts each associated virtual machine context is permitted to switch to during a later switch event;

determine that the virtual processor should switch from using a first virtual machine context to using a second virtual machine context, wherein an indication of the second virtual machine context is included within a transfer list of the first virtual machine context such that the virtual processor, while executing using the first virtual machine context, is permitted to switch to the second virtual machine context;

analyze a control bit of the first or second virtual machine context to determine whether the single virtual machine is configured to independently switch virtual machine contexts; and after determining that the first or second virtual machine context's control bit indicates that the single virtual machine is configured to independently switch virtual machine contexts, cause the virtual processor of the single virtual machine to independently switch from using the first virtual machine context to using the second virtual machine context, wherein the switch from using the first virtual machine context to using the second virtual machine context is performed (1) by executing functions native to a physical processor associated with the single virtual machine and (2) by independently switching from the first virtual machine context to the second virtual machine context on the same virtual machine.

10. The system of claim 9, wherein the virtual processor is configured to switch to contexts that are at different hierarchical privilege levels with respect to each other.

11. The system of claim 9, wherein the virtual processor is configured to switch between sibling contexts that have a same hierarchical privilege level with respect to each other.

12. The system of claim 9, wherein the hypervisor is configured to perform virtual context switching when the control bit indicates that the one or more processors of the computer system cannot perform the switch independently of the hypervisor.

13. The system of claim 9, wherein the transfer list of the first virtual machine context is active before the switch, and wherein a transfer list of the second virtual machine context is active after the switch.

14. The system of claim 13, wherein a data storage is configured to maintain the transfer list of each virtual machine context as an indexed list, such that each transfer list indexes memory locations where virtual machine contexts are stored and entry into any of the transfer lists is by an index such that a virtual machine calling into one of the transfer lists does not have access to information identifying the memory locations, but rather is only able to specify a pointer to an entry in the one of the transfer lists.

15. A computer system comprising:
one or more processors; and
one or more computer-readable hardware storage devices having stored thereon computer executable instructions that are executable by the one or more processors and that cause the computer system to efficiently manage a virtual machine by causing the computer system to:
identify a virtual processor of the virtual machine that includes a hypervisor, wherein the virtual processor has associated therewith a plurality of contexts, wherein the virtual processor is initially operating using a first context, and wherein each context included within the plurality is extended to include a corresponding control bit that is usable by the virtual processor to determine whether the single virtual machine is configured to independently switch virtual machine contexts, whereby, when the virtual machine is configured to independently switch contexts, whereby, when the virtual machine is configured to independently switch contexts, the virtual machine switches contexts without generating any intercepts to the hypervisor;
maintain a transfer list for each of the plurality of contexts such that each context has associated therewith a corresponding transfer list, each transfer list designating which, if any, other contexts each context is permitted to switch to during a later switch event;
receive, from the virtual machine, a notification indicating that the virtual processor is to switch from using the first context to using a second virtual machine context, wherein an indication of the second context is included within a transfer list of the first context such that the virtual processor, while executing using the first context, is permitted to switch to the second context;
store, at a storage associated with the one or more processors, a current state of the first context;
load, from the storage associated with the one or more processors, a previously saved state of the second context;
analyze a control bit of the first or second context to determine whether the virtual machine is configured to independently switch contexts; and
after determining that the first or second context's control bit indicates that the virtual machine is configured to independently switch contexts, cause the virtual processor to switch from using the first context to using the second context such that the virtual processor starts using the second context in accordance with the previously saved state,
wherein the switch from using the first context to using the second context is performed (1) by executing functions native to the physical processor and (2) by independently switching from the first virtual machine context to the second virtual machine context on the same virtual machine.

16. The computer system of claim 15, wherein the storage that is associated with the one or more processors is a register.

17. The computer system of claim 16, wherein causing the virtual processor to switch from using the first context to using the second context comprises:
identifying a current status of the first or second context's control bit, wherein the current status is selected from a group comprising (1) abled and (2) disabled; and
upon a condition in which the current status of the first or second context's control bit is identified as being disabled, causing the hypervisor to at least partially assist in causing the virtual processor to switch from using the first context to using the second context.

18. The computer system of claim 15, wherein receiving the notification indicating that the virtual processor is to switch from using the first context to using the second context comprises:
the virtual machine specifying, in a general purpose register associated with the one or more processors, that the virtual machine is to switch to using the second context.

19. The computer system of claim 18, wherein, after the virtual machine specifies that the virtual machine is to switch to using the second context, the virtual machine performs a validation on the second context.

20. The computer system of claim 15, wherein the virtual machine includes a second virtual processor, and wherein the second virtual processor has associated therewith a different plurality of contexts.

* * * * *